3,385,814
LINEAR POLYCARBONATE-CONTAINING SPINNING SOLUTIONS

Béla von Falkai, Artur Prietzschk, Wolfgang Rellensmann, Alfred Reichle, and Horst Wieden, Dormagen, Germany, assignors to Farbenfabriken Bayer Aktiengesellschaft, Leverkusen, Germany, a German corporation
No Drawing. Filed Mar. 31, 1964, Ser. No. 356,052
Claims priority, application Germany, Apr. 11, 1963, F 39,469
5 Claims. (Cl. 260—31.4)

ABSTRACT OF THE DISCLOSURE

Improved solutions based on the inclusion of monohydroxy, dihydroxy and/or higher polyhydroxy compounds and esters and ethers thereof in a solvent solution of a polycarbonate prior to use of the same as spinning solutions.

---

It is known to be possible to produce structures, which can be better crystallised, by adding non-solvents or poor solvents to solutions of high polymers which do not crystallise satisfactorily.

For example, it is possible, by adding carbon tetrachloride, benzene, methylpropylketone or di-n-butylether, to polycarbonate solutions to prepare foils of good crystallinity, and these foils, after stretching, have better technological properties than the non-crystalline material, whereas filaments spun from these solutions by the dry-spinning or wet-spinning processes only provide a small increase in the crystallinity under extreme spinning conditions. For example, at relatively low spinning temperatures, a crystallisation is certainly produced, but this is so irregular that the still soft, unfinished filaments likewise become very irregular when being drawn. These filaments are consequently unsuitable for a further processing.

In addition, whereas the added components in a quantity of an average 50 to 100%, based on the polycarbonate used, are sufficient for a good crystallisation when producing foils, the aforementioned non-solvents only have a comparatively low efficacy when producing filaments, even when they are added in a high excess, i.e. far above 100% or almost up to the gelling limit.

This different behaviour of the solution during the processing in one case to form films and in another case to form filaments is based on the differential evaporation of the solvent, which proceeds very much more slowly when producing films than when forming filaments. A more complete crystallisation of the polymer is therefore guaranteed, this being known to be dependent on time.

It has now been found that filaments or films with high crystallinity are capable of being produced from polycarbonate, more especially those derived from di-(monohydroxy - aryl) - alkanes, -sulphones, -sulphoxides, -sulphides or -ethers or a mixture of these dihydroxy compounds with one another, by adding to the polycarbonate solutions, prior to the shaping thereof, monohydroxy, dihydroxy and/or higher polyhydroxy compounds or their esters and ethers of the general formula

R—O—R'

(in which R represents alkyl, aryl or aralkyl and R' represents $[CH_2—CH_2—O]_n—X$, in which $n=1$ to 10 and X=H, alkyl, aryl, aralkyl or acyl), in a quantity of 10 to 100% and advantageously 25 to 50%, calculated on the quantity of dissolved polycarbonate. Particularly suitable as additives are for example diethyleneglycol monomethylether, ethyleneglycol monomethylether acetate and triethyleneglycol dimethylether.

Films which are produced by casting from solutions with the said additives do not show a spherolithic structure in polarised light when examined under the light of a microscope, but merely double-refracting elements which cannot be recognised microscopically and which indicate a very fine microcrystalline morphology. In addition, the X-ray diagram and the density point to a well-crystallised structure of the unstretched foil.

Depending on the nature of the additive, good results are particularly found with additions of 20 to 40%, based on the quantity by weight of the polycarbonate, to a 13 to 25% solution, more especially 16.5 to 18.5%.

With the transference of these results to the production of fibres by the dry or wet spinning processes, the addition of larger quantities of 25 to 100%, based on the quantity by weight of polycarbonate, prove to be expedient, and the concentration of the polycarbonate solution should be between 14 and 23%, more especially 15.8 to 18.8%.

In order to guarantee the stability of the spinning solution, the additives preferably are admixed continuously, only immediately before the shaping of the solution.

Due to their increased crystallinity, the filaments produced by the process of the invention have improved resistance to solvents, improved temperature stability and a low sensitivity to temperature during the stretching, whereby in particular a better uniformity of the titre of the stretched filaments is obtained.

The following table indicates the interference width, the density as a standard for the crystallinity of films and filaments and also the percentage mass fluctuations along the filament as a standard of the uniformity of filaments, which have been produced from polycarbonate solutions without added component and with an additive, which has scarcely any effectiveness, and also when using a added component produced according to the invention.

TABLE

| No. | Structure | Solution concentration, percent | Additive Type | Additive Quantity, percent | X-ray interference width, degree [1] | Density [2] | Filament uniformity, percent [3] | Resistance to trichlorethylene |
|---|---|---|---|---|---|---|---|---|
| 1 | Film | 18 | Without | | 2.8 | 1.1970 | | Unstable. |
| 2 | do | 18 | Benzene | 50 | 2.6 | 1.1980 | | Do. |
| 3 | do | 18 | Carbon tetrachloride | 50 | 2.45 | 1.1980 | | Do. |
| 4 | do | 17.5 | Methylglycol acetate | 40 | 1.40 | 1.2130 | | Stable. |
| 5 | do | 18 | Diethyleneglycol monoethylether | 25 | 1.50 | 1.2119 | | Do. |
| 6 | Filaments | 18 | Without | | 1.8 | 1.1970 | 20–30 | Unstable. |
| 7 | do | 17 | Benzene | 60 | 2.65 | 1.1975 | 20–30 | Do. |
| 8 | do | 17.5 | Methylglycol acetate | 42 | 1.32 | 1.2140 | 2–6 | Stable. |
| 9 | do | 17 | Diethyleneglycol monoethylether | 28 | 1.4 | 1.2160 | 2–6 | Do. |

[1] The "interference width," as used herein, means the width of the main maximum of the X-ray dispersion curve of polycarbonate recorded with Cu K-radiation. It is measured at half the height of the main maximum and expressed as degrees of angle in the angular measurement of the glancing angle (half dispersion angle). On account of the solvent residues still initially contained in the polycarbonate, the measurement of the interference width is more reliable than that of the crystalline fraction.
[2] The density was determined by the suspension method in untensioned water.
[3] The filament uniformity was determined with an Uster instrument as a percentage mass fluctuation.

Example 1

A polycarbonate of the intrinsic viscosity $[\eta]=0.85$, which was produced from di-(4-hydroxyphenyl)-2,2-propane and phosgene, is dissolved in methylene chloride to an 18% solution, forced through a filter press and spun from a 25-aperture spinneret with an aperture diameter of 0.09 mm. into a heated shaft, which is blown with heated air at the nozzle. The filament is drawn off over a roller system and wound on to spools at a speed of 150 m./min.

The filaments stretched in the ratio 1:4.8 above the coagulation temperature (ET) have the following properties:

| | |
|---|---|
| Titre _____den__ | 80 |
| Strength _____g./den__ | 3.2 |
| Elongation at break _____percent__ | 28 |
| Filament uniformity ____percent mass fluctuations__ | 25 |
| X-ray interference width _____degrees__ | 2.5 |

Example 2

A polycarbonate of the intrinsic viscosity $[\eta]=0.85$, produced from di-(4-hydroxyphenyl)-2,2-propane and phosgene, is dissolved in methylene chloride to form a 22% solution, forced through a filter press and supplied to a mixing member. A mixture of diethyleneglycol monoethylether and methylene chloride is also injected into this mixing member in such a ratio and in such a quantity that, on leaving the mixing member, there is obtained a 17% polycarbonate solution with a diethyleneglycol monoethylether content of 28%, based on the polycarbonate.

The solution, thus thoroughly mixed with the added component, is immediately forced through a 25-aperture spinneret with an aperture diameter of 0.09 mm. into a heated shaft, which is blown with heated air at the spinneret. The filaments are drawn off over roller systems and wound at a speed of 150 m./min. The filaments stretched above the ET in the ratio 1:4.8 have the following properties:

| | |
|---|---|
| Titre _____den__ | 80 |
| Strength _____g./den__ | 2.8 |
| Elongation at break _____percent__ | 29 |
| Filament uniformity __percent mass fluctuation__ | 3 |
| X-ray interference width as standard for the crystallinity _____degrees__ | 1.4 |
| Density _____ | 1.2160 |
| Stability in trichlorethylene _____ | Stable |

Example 3

The procedure of Example 2 is followed, but a mixture of methylglycol acetate with methylene chloride is injected into the mixing member in such a ratio and in such a quantity that the result is a 17.5% polycarbonate solution with a methylglycol acetate content of 42%, based on polycarbonate. The filaments obtained after the stretching effected in the ratio 1:5 at a temperature above the ET have the following properties:

| | |
|---|---|
| Titre _____den__ | 80 |
| Tensile strength _____g./den__ | 3.15 |
| Elongation at break _____percent__ | 27 |
| Filament uniformity _____do____ | 3.5 |
| X-ray interference width as standard for the crystallinity _____degrees__ | 1.32 |
| Density _____ | 1.2140 |
| Stability in trichloroethylene _____ | Stable |

Example 4

The polycarbonate solution produced according to Example 3 with an addition of methylglycol acetate is cast on a drum to form a film and is dried for 5 minutes in a stream of air at a temperature of 145° C. After the film thus produced has been stretched, it has a strength of 28 kg./mm.$^2$ and an elongation of 26%. The X-ray interference width is 1.4° with a density of 1.2210.

We claim:

1. A composition suitable for use as a spinning solution comprising at 13 to 25% by weight methylene chloride solution of a linear polycarbonate having included therein a compound of the formula:

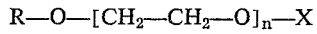

wherein R is lower alkyl, $n$ is an integer from 1 to 10 and X is a member of the group consisting of hydrogen, lower alkyl and lower alkanoyl, the amount of included compound of said formula being from 10–100% by weight, calculated on the weight of dissolved polycarbonate.

2. The composition of claim 1 wherein the compound of said formula is selected from the group consisting of diethylene glycol monomethyl ether, ethylene glycol monomethyl ether acetate and triethylene glycol dimethyl ether.

3. The composition of claim 1 wherein the compound of said formula is included in an amount of from 25 to 50% by weight, calculated on the weight of dissolved polycarbonate.

4. The composition of claim 1 wherein said composition is for spinning fibers, the concentration of the methylene chloride-polycarbonate solution is between 14 and 23% by weight and said compound of said formula is present in an amount of from 25 to 100% by weight, calculated on the weight of dissolved polycarbonate.

5. In the process of producing shaped articles from a linear polycarbonate spinning solution, the improvement which comprises employing a 13 to 25% by weight methylene chloride solution of a linear polycarbonate having included therein a compound of the formula:

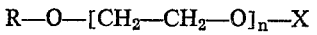

wherein R is lower alkyl, $n$ is an integer from 1 to 10 and X is a member selected from the group consisting of hydrogen, lower alkyl and lower alkanoyl, the amount of included compound of said formula being from 10–100% by weight, calculated on the weight of dissolved polycarbonate.

References Cited

UNITED STATES PATENTS 3,112,292   11/1963   Bottenbruch et al. ___ 260—77.5

MORRIS LIEBMAN, *Primary Examiner.*

J. E. CALLAGHAN, *Assistant Examiner.*